(12) United States Patent
Scott et al.

(10) Patent No.: US 7,673,055 B2
(45) Date of Patent: Mar. 2, 2010

(54) SYSTEM AND METHOD FOR AUTOMATICALLY RESPONDING TO A RECEIVED COMMUNICATION

(75) Inventors: Sherryl Lee Lorraine Scott, Toronto (CA); Gary P. Mousseau, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 1048 days.

(21) Appl. No.: 11/159,118

(22) Filed: Jun. 23, 2005

(65) Prior Publication Data

US 2007/0011367 A1    Jan. 11, 2007

(51) Int. Cl.
G06F 15/16    (2006.01)
(52) U.S. Cl. .................... 709/228; 709/206; 709/220; 379/93.01; 455/412.2
(58) Field of Classification Search ................ 709/228, 709/206, 220; 370/254; 455/412.1, 412.2, 455/414.1; 379/93.01
See application file for complete search history.

(56) References Cited

U.S. PATENT DOCUMENTS

| 6,640,230 | B1 * | 10/2003 | Alexander et al. ............ 707/10 |
| 6,658,095 | B1 * | 12/2003 | Yoakum et al. .......... 379/93.01 |
| 2001/0031633 | A1 | 10/2001 | Tuomela et al. |
| 2002/0172340 | A1 | 11/2002 | Kato |
| 2004/0002329 | A1 * | 1/2004 | Bhatia et al. ............. 455/422.1 |
| 2005/0002498 | A1 | 1/2005 | Kao |
| 2005/0037741 | A1 * | 2/2005 | Gilbert ..................... 455/414.1 |
| 2005/0101304 | A1 | 5/2005 | Lin et al. |
| 2005/0276397 | A1 * | 12/2005 | Hiatt et al. ............... 379/90.01 |
| 2007/0101284 | A1 * | 5/2007 | Shaw et al. ................. 715/772 |
| 2009/0132662 | A1 * | 5/2009 | Sheridan et al. ............ 709/206 |
| 2009/0177745 | A1 * | 7/2009 | Davis et al. ................. 709/204 |

FOREIGN PATENT DOCUMENTS

| EP | 1 220 521 A2 | 7/2002 |
| JP | 2004 274644 A | 9/2004 |
| WO | WO-2004/008411 A1 | 1/2004 |

OTHER PUBLICATIONS

AOL Instant Messenger Help/FAQ 2002 America Online, Inc. Accessed via Internt Archive Wayback Machine http://web.archive.org/web/20030605131617/http://www.aim.com/help_faq/using/away.adp?aolperm=Page cached Jun. 5, 2003.*
"FreeBusy for MS Outlook" In 4Team Newsletter [magazine online]. Mar. 8, 2005. Available from World Wide Web @ http://freebusy.4team.biz/.
Yehl, T. Bryce. "Blogging Anywhere" In Bryce's Radio Experiments [weblog]. Mar. 6, 2002. Available from World Wide Web @ http://radio.ntwizards.net/stories/2002/03/06/bloggingAnywhere.html.

* cited by examiner

*Primary Examiner*—Thu Ha T Nguyen
(74) *Attorney, Agent, or Firm*—McCarthy Tétrault LLP

(57) ABSTRACT

A device and a method of responding to a received interrupt event received by a communication device is provided. The method comprises accessing data associated with a calendar application and/or a location application to determine a current state of availability of a user of the device using data; determining whether a response action is to be sent in response to the event when the device is note available; and sending the response action. The device incorporates modules to perform the method.

21 Claims, 6 Drawing Sheets

SYSTEM AND METHOD FOR AUTOMATICALLY RESPONDING TO A RECEIVED COMMUNICATION

FIELD OF THE INVENTION

The invention described herein relates to a system and method for a communication device automatically responding to a received communication such as an e-mail, voice mail, telephone call short message service (SMS), etc. In particular, the invention described herein relates to providing a context-based response to the received communication, depending on programmable responses provided to the device.

BACKGROUND OF THE INVENTION

The world has grown accustomed to mobile telephonic devices (MTD) such as cell phones and phone-based Personal Digital Assistants (PDAs). These devices function in a wireless network where one or more such devices communicate using voice or data to each other or to external services. Services can include making external phone calls to land-line voice networks, making phone calls to other cell phones, leaving or retrieving voice mail message or exchanging data messages, such as e-mails, text messages, pages and others.

There can be issues with responding to senders of communications to such devices. There is a perception that users of such devices are always accessible and are always connected to emails, voicemails etc. If a sender of an urgent communication is expecting (either rightly or wrongly) an immediate response and if the recipient cannot currently monitor for receipt of such a communication, (e.g. because he is in a meeting), then the recipient will not be able to respond to the sender. Prior art auto-response systems, like "vacation"-type responses for emails provide limited response capabilities and they lack flexibility with the content, format and medium used for the response.

There is a need to address the deficiencies in the prior art.

BRIEF DESCRIPTION OF THE DRAWINGS

The invention will now be described, by way of example only, with reference to the accompanying drawings, in which.

DETAILED DESCRIPTION OF AN EMBODIMENT

Figure 1:
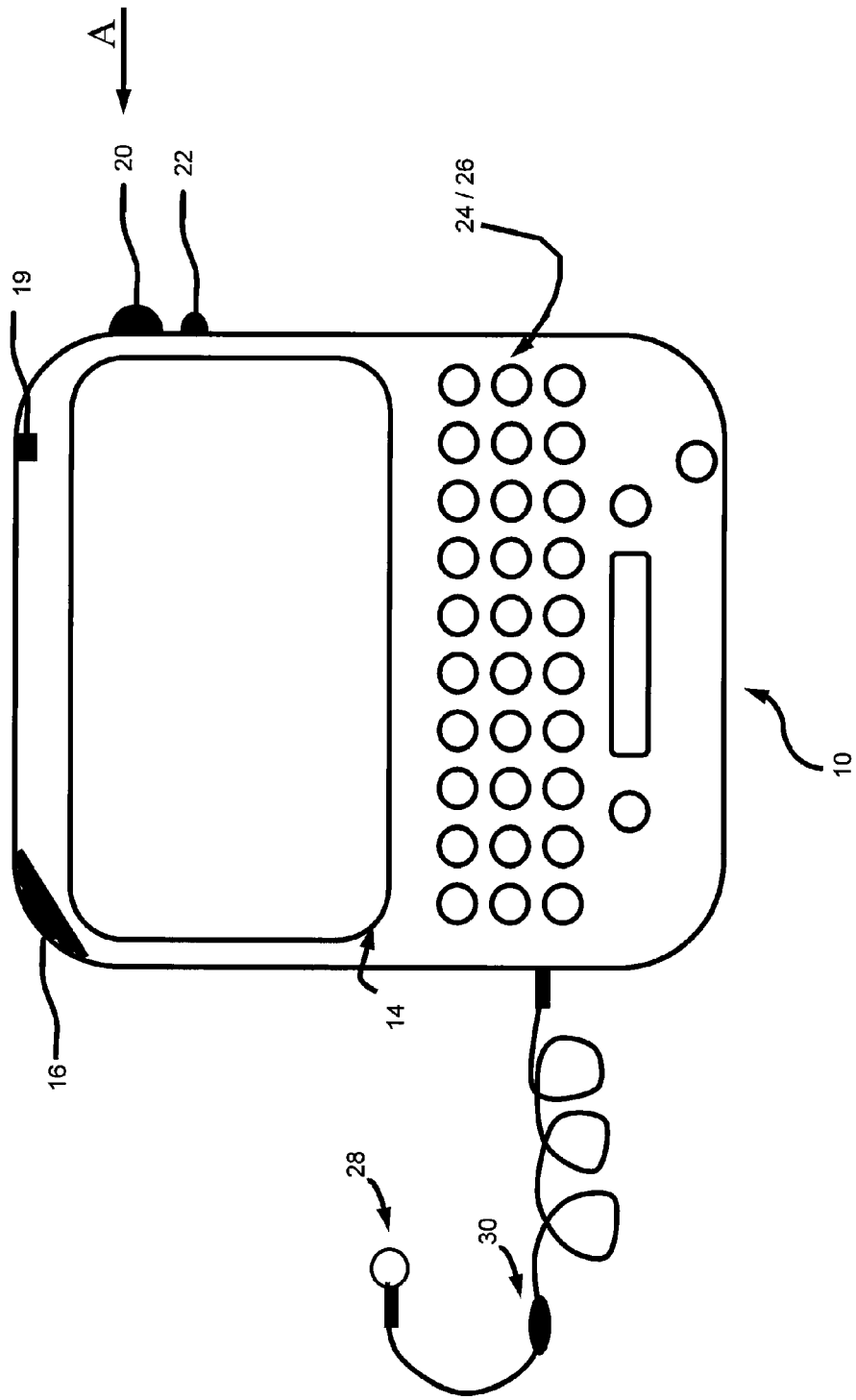
FIG. 1 is a schematic representation of an electronic device in accordance with an embodiment.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

In a first aspect, a method of responding to a received interrupt event for a user of a communication device is provided. The method comprises the following steps:
  accessing data associated from at least one application operating on the device to determine a current state of availability of the user;
  determining whether a response action is to be sent in response to the interrupt event when the device is in the current state of availability; and
  if the response action is to be sent,
    building the response action utilizing context data associated with at least one application operating on the device, the context data providing context to the response action; and
    sending the response action to a sender associated with the interrupt event.

The interrupt event can be a telephonic communication (e.g. cellular call) or a text-based communication (e.g. SMS or email message) or another event.

The response action may provide details relating to the current state of availability of the user.

The response action may be sent using the same communication method used by the communication.

A second response action may be generated and sent to the sender by using a communication method different than that used to receive the interrupt event. For example the response action may be to generate and send an email and the second response action may be to generate and send an SMS message or telephone call. Other combinations of communication techniques may be used.

Upon a change of the current state of availability for the device, another response action may be sent to the sender advising of the change. Alternatively, upon a change of the current state of availability, a notice may be provided to the user indicating any responses which were sent prior to the change. The notice may include a link to initiate a response communication with the sender.

In the method, the data relates to a current location identified by said location application; the location application relates to a GPS function; and the response action indicates that the user is in the current location.

In the method, the context data may be extracted from two or more applications and may provide data associated with the sender and with said current state of availability of the user.

In the method, the current state of availability of the user may selected from a do not disturb state, an available state and a not available state.

In a second aspect, a communication device for receiving and responding to a received communication is provided. The device comprises: a calendar application to track and provide a current state of availability of a user; a communication module to receive and send communications utilizing at least one communication technology; and an application to track an interrupt event, such as a received communication received from the communication module, and to identify whether a response action is to be sent to a sender of the received communication in response to the interrupt event. If the response action is to be sent, then the application builds the response action utilizing context data associated with at least one application operating on the device and sends the response action to a sender associated with the interrupt event.

In the device, for the response action, the application may provide details relating to the current state of availability.

The response action may be sent using the communication technology associated with the received communication.

The device may provide data and telephonic communications. Also, the application may send the response action using a different communication technology from a communication technology associated with the received communication.

The application may send another response action to the sender upon a change of the current state of availability of the user.

The application may generate a notice on the device indicating responses sent prior to the change of the current state of availability. The notice may include a link to initiate a response communication with the sender.

In the device, the context data may be extracted from at least two applications. The data may provide at least data associated with the sender and with the current state of availability of the user. Further, the current state of availability of the user may selected from a do not disturb state, an available state and a not available state.

In other aspects various combinations of sets and subsets of the above aspects are provided.

Referring to FIG. 1, an electronic device for receiving electronic communications, in accordance with an embodiment of the invention is indicated generally at 10. In the present embodiment, electronic device 10 is based on a computing platform having functionality of an enhanced personal digital assistant with cellphone and e-mail features. It is, however, to be understood that electronic device 10 can be based on construction design and functionality of other electronic devices, such as smart telephones, desktop computers pagers or laptops having telephony equipment. In a present embodiment, electronic device 10 includes, a housing 12, which frames an LCD display 14, a speaker 16, and LED indicator 19, a trackwheel 20, an exit key 22 and key 24 and a telephone headset comprised of an ear bud 28 and a microphone 30. Trackwheel 20 and exit key 22 can be inwardly depressed along the path of arrow "A" as a means to provide additional user-input. It will be understood that housing 12, can be made from any suitable material as will occur to those of skill in the art. Device 10 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and the many forms of 802.11 wireless broadband, like 802.11a, 802.11b, 802.11g, etc. that can support voice. Other embodiments include Voice over IP (VoIP) type streaming data communications that cap simulate circuit switched phone calls. Ear bud 28 can be used to listen to phone calls and other sound messages and microphone 30 can be used to speak into and input sound messages to device 10.

Figure 2:
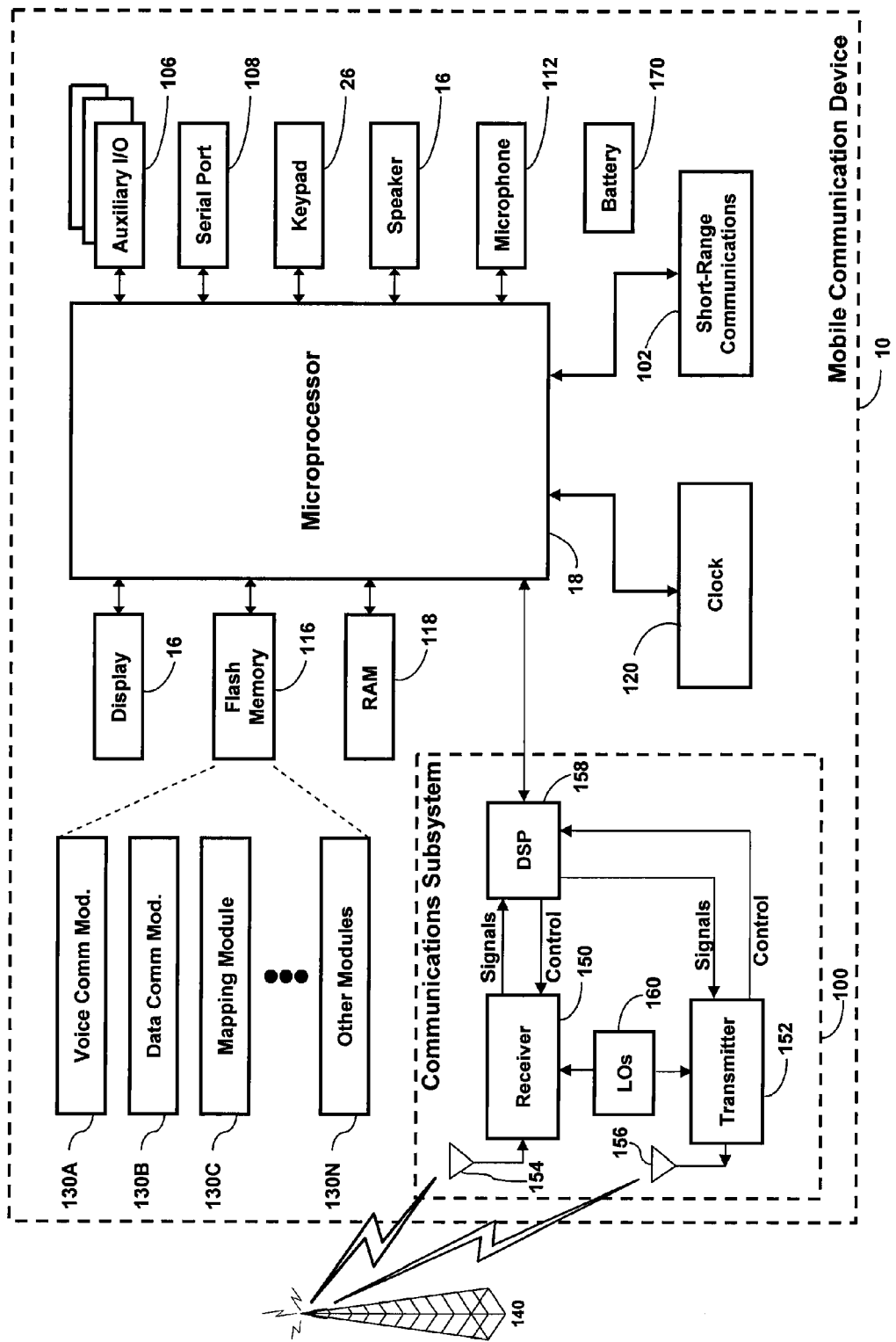
FIG. 2 is a block diagram of certain internal components within the device in FIG. 1.

Referring to FIG. 2, functional elements of device 10 are provided. The functional elements are generally electronic or electro-mechanical devices. In particular, microprocessor 18 is provided to control and receive almost all data, transmissions, inputs and outputs related to device 10. Microprocessor 18 is shown schematically as coupled to keypad 26, display 14 and other internal devices. Microprocessor 18 controls the operation of the display 14, as well as the overall operation of the device 10, in response to actuation of keys on the keypad 26 by a user. Exemplary microprocessors for microprocessor 18 include Data 950 (trade-mark) series microprocessors and the 6200 series microprocessors, all available from Intel Corporation.

In addition to the microprocessor 18, other internal devices of the device 10 are shown schematically in FIG. 2. These include: a communication subsystem 100; a short-range communication subsystem 102; keypad 26 and display 14, with other input/output devices including a set of auxiliary I/O devices 106, a serial port 108, a speaker 110 and a microphone port 112 for microphone 30; as well as memory devices including a flash memory 116 (which provides persistent storage of data) and Random Access Memory (RAM) 118; clock 120 and other device subsystems (not shown). The device 10 is preferably a two-way radio frequency (RF) communication device having voice and data communication capabilities. In addition, device 10 preferably has the capability to communicate with other computer systems via the Internet.

Operating system software executed by the microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications that control basic device operations, such as a voice communication module 130A and a data communication module 130B, may be installed on the device 10 during manufacture or downloaded thereafter. Cell mapping module 130C may also be installed on device 10 during manufacture. As well, additional software modules, illustrated as an other software module 130N, which may be, for instance, a personal information manager (PIM) application, may be installed during manufacture or downloaded thereafter into device 10. PIM application is preferably capable of organizing and managing data items, such as e-mail messages, calendar events, voice mail messages, appointments, and task items.

Communication functions, including data and voice communications, are performed through the communication subsystem 100, and possibly through the short-range communication subsystem 102. Communication subsystem 100 includes receiver 150, transmitter 152 and one or more antennas, illustrated as receive antenna 154 and transmit antenna 156. In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice (telephonic) networks, both separate and integrated, may also be utilized with device 10. In any event, communication subsystem 100 provides device 10 with the capability of communicating with other devices using various communication technologies, including instant messaging (IM) systems, text messaging (TM) systems and short message service (SMS) systems.

In addition to processing communication signals, DSP 158 provides control of receiver 150 and transmitter 152. For example, gains applied to communication signals in receiver 150 and transmitter 152 may be adaptively controlled through automatic gain control algorithms implemented in DSP 158.

In a data communication mode, a received signal, such as a text message or web page download, is processed by the communication subsystem 100 and is provided as an input to microprocessor 18. The received signal is then further processed by microprocessor 18 which can then generate an output to the display 14 or to an auxiliary I/O device 106. A device user may also compose data items, such as e-mail messages, using specific keys on keypad 26, a thumbwheel associated with keypad 26, and/or some other auxiliary I/O device 106, such as a touchpad, a rocker switch, a separate thumbwheel or some other input device. The composed data items may then be transmitted over communication network 140 via communication subsystem 100. Subsystem 100 may also detect when it is out of communication range for its remote systems.

In a voice communication mode, overall operation of device 10 is substantially similar to the data communication mode, except that received signals are output to speaker 16, and signals for transmission are generated by microphone 30. Alternative voice or audio I/O subsystems, such as a voice message recording subsystem, may also be implemented on device 10. In addition, display 14 may also be utilized in voice communication mode, for example, to display the identity of a calling party, the duration of a voice call, or other voice call related information.

Short-range communication subsystem 102 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack. A power switch (not shown) provides an "on/off" switch for device 10. Upon activation of the power switch an application 130 is initiated to turn on device 10. Upon deactivation of the power switch, an application 130 is initiated to turn off device 10. Power to device 10 may also be controlled by other devices and by internal software applications, as described further below.

Figure 3:
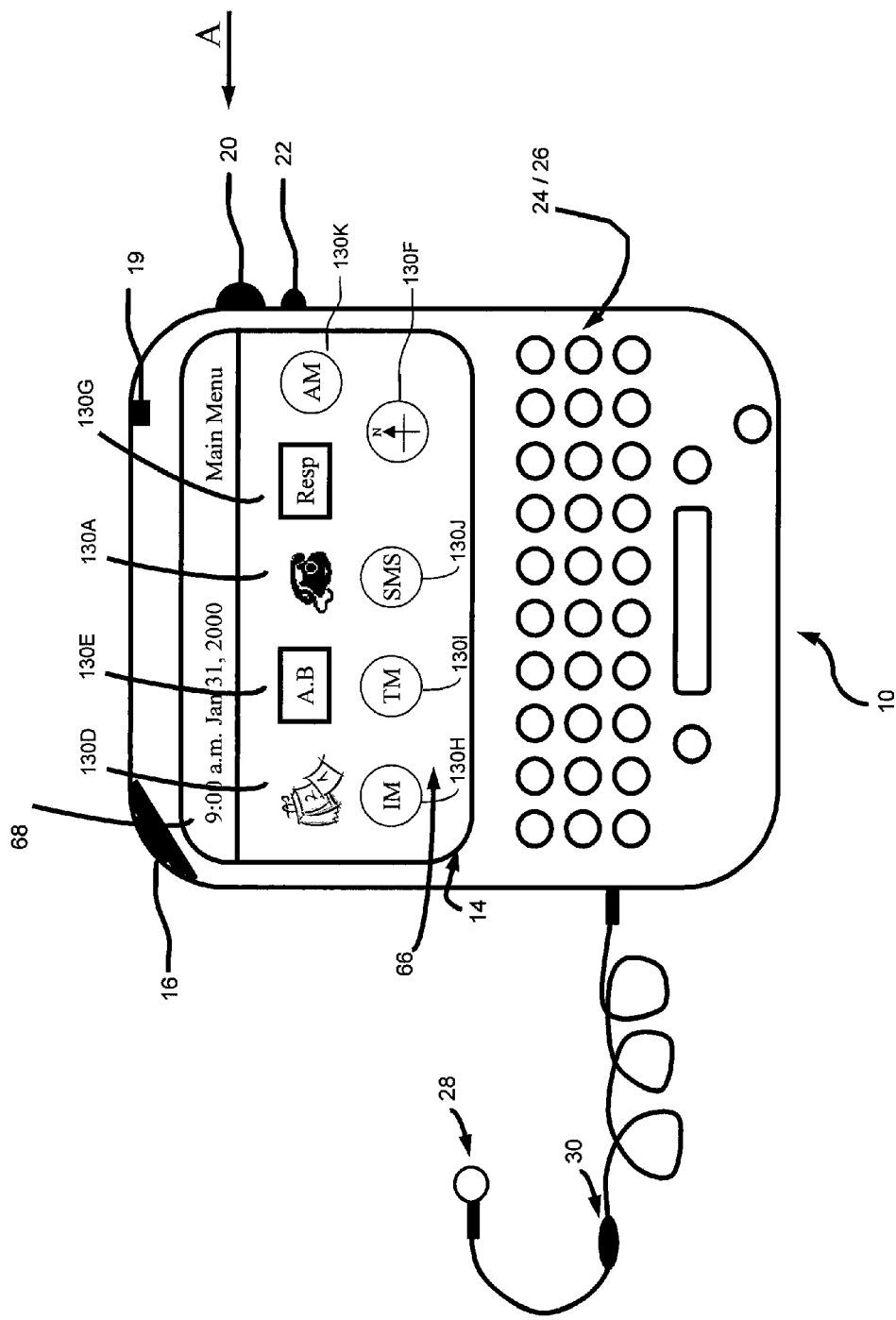
FIG. 3 shows the device of FIG. 1 with the main screen displaying a plurality of applications including an address book, a calendar, an instant message module, a short message service module, a response application and an availability manager.

Referring now to FIG. 3, device 10 is shown in operation where applications 130 stored therein are being executed. One overall application is responsible for generating and controlling aspects of main menu screen 66, that displays a system clock 68 which is updated according to internal clock 120. Main menu screen 66 also displays a plurality of additional applications that are executable on processor 18. Trackwheel 20 can be used to scroll through the applications and to select a desired application by pressing inwardly, along the path of arrow A, on trackwheel 20. Exit key 22 can be used to exit any application by pressing inwardly, along the path of arrow A, on exit key 22.

Exemplary applications 130 operating on device 10 include calendar 130D, address book 130E, location module 130F, response application 130G, IM application 130H, TM application 130I, SMS application 130J and availability manager 130K. Data associated with each application can be stored in flash memory 116.

Calendar 130D tracks appointments and other status matters relating to the user and device 10. It provides a daily/weekly/month electronic schedule of appointments, meetings and events entered by the user. Calendar 130D tracks time and day data for device 10 using processor 18 and internal clock 120. The schedule contains data relating to the current accessibility of the user. For example it can indicate when the user is busy, not busy, available or not available. The application can also set a "do not disturb" window of time. Effectively, device 10 is set to not notify the user when an interrupt event occurs in spite of any lack of scheduled appointments during that window. For example, if a telephone call is received in that window, the application can automatically route the call to voice mail without initiating the ring tone on device 10, and if an email is received, it is automatically stored, but no enunciation is generated. Once the window is finished, device 10 can then generate notifications (e.g. ring tones, buzz signals) on device 10 to alert the user of the previously received events. At that point, the user may then access the storage systems on device 10 to retrieve any stored particulars relating to the events. The "do not disturb" window allows the user to override any availability settings which are set on device 10 by other applications.

Availability may also be tracked using data extracted from a "to-do" application operating on device 10. The application can provide context and time sensitive lists of actions which need to be done by the user. The application may be incorporated into calendar application 130D or may be implemented as a separate notes application (not shown).

In use, calendar 130D generates input screens on device 10 prompting the user to input scheduled events through keyboard 48. Alternatively, notification for scheduled events could be received via an encoded signal in a received communication, such as an e-mail, SMS message or voicemail message. Once the data relating to the event is entered, calendar 130D stores processes information relating to the event; generates data relating to the event; and stores the data in memory in device 10, preferably non-volatile memory flash 116. This data can be accessed by calendar 130D and other applications.

Address book 130E enables device 10 to store contact information for persons and organizations. In particular, name, address, telephone numbers, e-mail addresses, cellphone numbers and other contact information is stored. The data is stored in non-volatile memory, such as persistent storage 116 in device 10 in a database. In use, the database is organized such that individual contact information can be accessed and cross referenced to other data in the same or other applications.

Location module 130F provides the current geographic location of device 10. In one embodiment, it receives and interprets remote GPS signals from a system of satellites to triangulate the current location of device 10, using, for example GPS modules and applications known in the art. On device 10, a GPS interface application controls the storage of GPS data retrieved by location module 130F. Alternatively, location information may be determined by analyzing encoded data relating to cellular telephone calls executed on device 10. For example, the encoded data stream can be examined to identify the current base station to which device 10 is communicating.

In any event, once location module 130F has location information for the device, it provides graphical information in a map presented on display 14 showing the current location of device 10. As specific locations may have specific contexts for the user (e.g. home, office, cottage, parents' home, etc.), GPS interface application allows associations to be made between specific locations or regions with appropriate text labels. The associations are stored in a database and can be accessed by all applications 130 as needed.

Using the above noted applications and their associated data, an embodiment can determine the current availability of the user of device 10. For example, calendar 130D and its associated data can identify whether the user is currently listed as being in a meeting and if so, what time the meeting is scheduled to end. Also, using the GPS data, the embodiment can identify when the user is at home, the office or elsewhere. The current availability can be set using data from one, two or more applications.

In a general sense, an embodiment provides the ability to determine the availability of a user of device 10 by checking data extracted from at least one of a plurality of systems which can track indicators of the current availability of the user. When an interrupt event is received by device 10, the availability of the user is determined by checking the relevant data from the applications. Depending on the status of the availability, a custom response action can be built using context data from a plurality of applications in the device. The context data can provide personal information relating to the sender or the user of the device. When the action is built (in the form of a response message), it is sent to the sender of the communication using a communication system provided by device 10.

Using the current availability of the user, the embodiment provides customized, context-sensitive response actions (such as response messages) to interrupt events (such as received communications). In order to provide a customized response, response application 130G defines, maintains and controls execution of a set of programmable response actions to interrupt events. It utilizes identification data associated with the event (e.g. email's sender, caller ID of telephone call) and allows specific identification associations to be made with the identification data. For example, if the interrupt event is a telephone call having a caller ID of "555-1212", the caller ID may be associated with the user's boss and an email from a specific set of addresses may be associated with the user's spouse. When an interrupt event occurs, response application 130G accesses the identification associations relating to the event to identify its source. It also accesses the current availability data derived from the above noted sources and then analyzes the source of the event with the data and any predetermined custom responses set for that source. It then selectively creates and sends a response to the source of the received communication based on the results of the analysis. All communications are provided through either the communication subsystem 100 or the short range communication subsystem 102 of device 10. Response application 130G provides the appropriate communication system with any necessary destination or message information for the communication.

In order to set all of the parameters regarding receiving and responding to communications, response application 130G provides an user interface for the user of device 10 to identify specific types of received communications and set specific response actions to them. The response actions can be dictated by a variety of factors, such as: (1) the assigned importance of the interrupt event; and (2) the current availability of the user. For each factor, depending on the level of importance assigned to the noted event, a different response action can be generated and sent. Also, several responses in different communications modes (e.g. telephone, email and SMS messages) may be sequentially and/or conditionally sent, depending on the parameters set by the user.

In particular, response application 130G produces an user interface that allows the user to define (either manually or from links from other sources, such as the address book data) a specific set of response(s) to be generated and sent in response to a particular received communication. One user interface categorizes received events as having different levels of importance, such as Ignore, Standard and Urgent. For each level of importance, an event is provided with a pre-set type of response. However, each response action still can be customized by the user according his needs. Table A provides a template of an exemplary set of levels of importance with initially programmed responses.

TABLE A

Exemplary Customized Responses for Communications sent from several sources

| Level of Importance | Interrupt Event (as a Received Communication) | Response Action |
|---|---|---|
| Ignore | e-mail from "user1@rim.com" | none |
| | telephone call from "555-1212" | do not route call to voice mail |
| | all SMS messages | none |
| Standard | e-mail from any unspecified source | reply with generic unavailable e-mail |
| | telephone call from any unspecified number | route to voice-mail with preset greeting message |
| | SMS message from any unidentified number | none |
| Urgent | e-mail from "spouse@rim.com" | reply email with custom response; auto-reply SMS message with a similar response; and auto-reply email once user becomes available again. Details of response are taken from the current calendar information from the calendar application |
| | telephone call from boss | reply call with preset message; and reply email to associated email address with preset message |
| | SMS message from "555-2222" | reply with telephone call with custom message and reply with SMS custom message |

Additional levels of importance may be provided, such as customized urgent, customized ignore and emergency. An emergency level may be set to override any non-available status. For example, if an incoming call from telephone number "911" is received, then a response action can be set to send a special response via email and to allow the the call to go through regardless of the current availability of the user. Also, additional templates may be implemented to provide different response actions depending on the current availability of the user. For example, different sets of actions can be defined and implemented depending the status of the current availability and/or location of the user. For example, different sets used when the location module indicates that the user is at either the user's home or office and additional sets can be used when the calendar application indicates that the user is in a work meeting or at the gym.

In other embodiments, the user may be presented with other user interfaces which provide entry of response actions in different orders. For example, one user interface implements a sender-centric approach. In such an interface, response application provides a template for a particular sender and allows the definition of different response actions to be made depending on the current availability of the user. Table B provides a template of an exemplary set of programmed responses to communications from a particular sources.

TABLE B

Exemplary Customized Responses for one Sender, e.g. spouse of user

| Interrupt Event (as a Received Communication) | Current availability | Response Action |
|---|---|---|
| IM "spouse@rim.com" | in meeting (according to calendar application) | reply with preset message |
| email from "spouse@rim.com" | at work (according to GPS application) | reply with another preset message |
| telephone call from "555-1212" | in meeting (according to calendar application) | SMS reply with preset message |
| telephone call from "555-1212" | at gym (according to calendar application) | SMS reply with another preset message |

As a variation on ranking features illustrated in Tables A and B, additional tables may be provided which allow a consistent type of response to be generated and sent depending on the type of received communication, e.g. all telephone calls are sent to voice mail, all emails are ignored, etc. Once the data is entered into the corresponding forms, it is stored as data in memory in device 10, preferably non-volatile memory such as flash memory 116. This data can be accessed by response application 130G and other applications.

When responses are generated and sent, the embodiment keeps a log of details of the response actions. As with other data, this data is stored in memory in device 10, preferably non-volatile memory such as persistent storage 116. This data can be accessed by response application 130G and other applications.

As noted above, the embodiment provides customized responses for received communications. In order to define and store a set of customized responses, the embodiment provides a series of user interfaces to define parameters for each response. Two responses exemplary are an auto-reply email and an auto-reply SMS message. Form A provides an exemplary response defined and saved by the user which is selectively sent in response to identified received communications.

---

Form A

Dear: % sender
I'm sorry but I can't review your email now, as I'm in meeting, which is scheduled to end by % endtime. Please try again later. You may wish to try calling me at % contact.

---

For Form A, a macro function enables its fields to be populated from data stored in any application, such as calendar application 130D, address book 130E or location module 130F. Such data can be used as context data to provide customized information in the response. As such, macro fields are denoted with a "%" prefix and a label (in bold). Data for the fields may be extracted from the received communication and calendar application 130D. For example, if the received interrupt event is a telephone call, the % sender data may be extracted from calling party data stored with address book 130E which is correlated to the received telephone number. Also, the % endtime field may be extracted from calendar data stored with calendar application 130D which is correlated to the current meeting schedule of the user stored therein. It will be appreciated that other label fields can be used to build a form to meet different needs for the user. Each field may access data stored in association with any application 130, as needed. For a telephone reply message, the embodiment can use a stored digitized voice message, a stored custom message or a stored sound note which is played when device 10 is programmed to make a telephone call in response to a received telephone call having a defined response associated with it. For the responding call, device 10 utilizes a telephonic call module is communication subsystem 100 to identify and initiate an appropriate call.

Other features of the embodiment include the ability to generate an additional response action to one or more specific senders when the state of availability changes from "unavailable" (e.g. presently in a meeting, presently in a "do not disturb" setting, or presently at "home") to "available" (e.g. meeting has ended or presently "in transit" from home). The additional response action can be of any type. One response action is to generate and send a response message that advises the sender of the change of status. In order to identify when and to whom such additional messages should be sent to, the embodiment accesses the log data of sent response actions relevant information (e.g. sender, type of message sent, etc.).

As another feature, upon the change of status of the user, the device may generate a notice on device 10 which provides details on the logged communications received and responded to during the event. The notice may be sent via email, or may be provided as a separate message by response application 130G. The notice can give particulars of each received communication, and for selective communications (e.g. communications marked as "urgent"), the notice can provide a link to the user to initiate a response communication immediately (e.g. initiate a telephone call or an email message).

It will be appreciated that the above noted features may be implemented in various software modules stored in an embodiment. Separate modules may be provided for identifying received interrupt events, building an appropriate response, and sending a response. One exemplary implementation is provided below.

Figure 4:
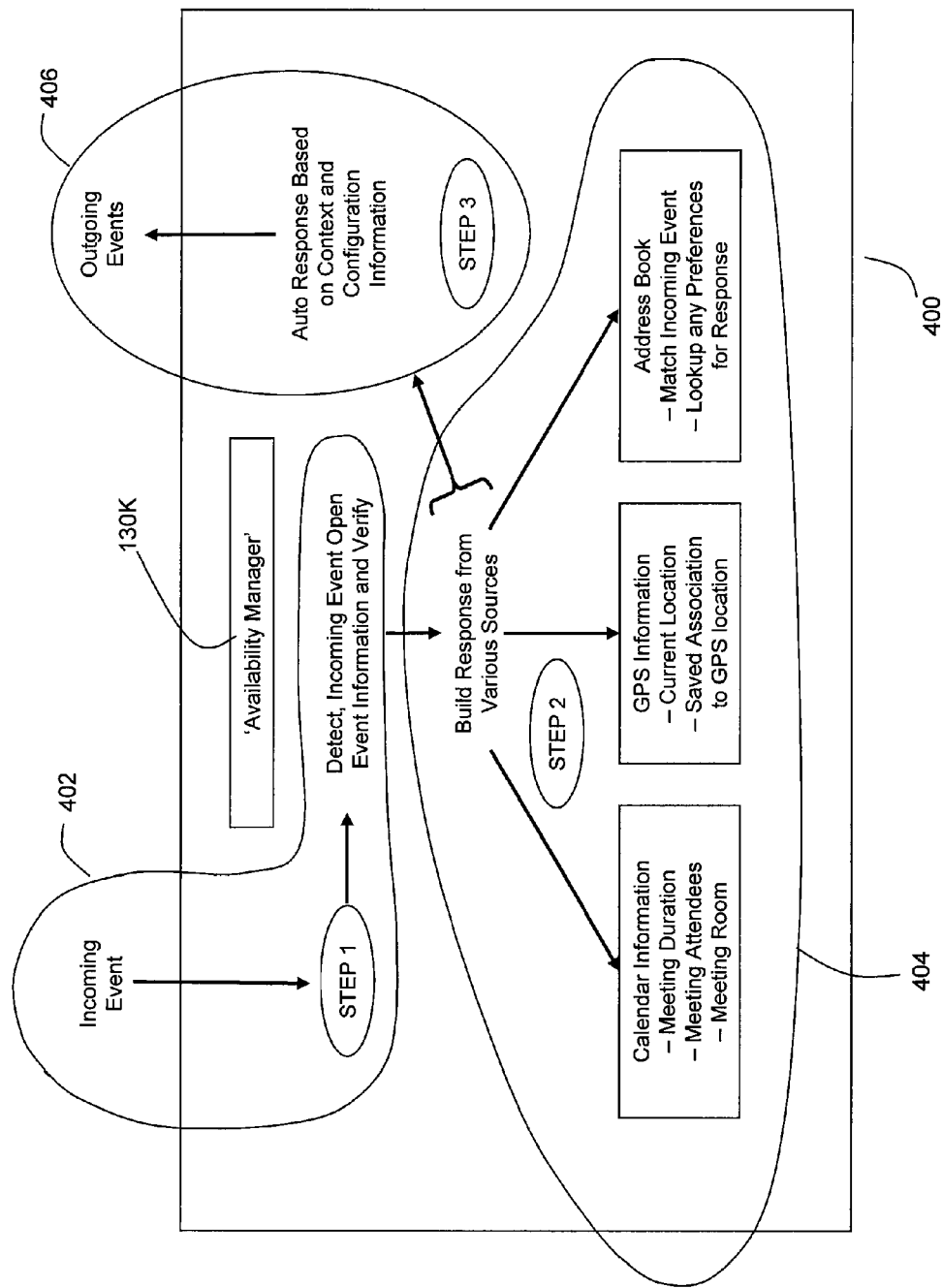
FIG. 4 is a flow chart of basic steps performed by the availability manager module of an embodiment of FIGS. 1 and 3 when an interrupt event is received.

As noted, response module 130G operates to define response actions to received interrupt events. In another embodiment, availability manager 130K also operates on device 10 and manages the process of receiving interrupt events, analyzing them for response actions, then generating and sending any response action. As shown, it provides similar, but expanded, functionalities over response application 130G. Referring to FIG. 4 flow chart 400 provides a view of the three processes conducted by availability manager 130K. The first process, shown at 402, detects an interrupt event received by device 10. To accomplish this, availability manager 130K is provided an indication from other modules (such as communications subsystem 100 or short-range communications module 102) that an interrupt event has been received. Availability manager 130K then identifies relevant source data from the event and then optionally verifies the data. The second process, shown at 404, builds an appropriate response action in response to the event. The response action is determined using availability data associated with the user. The availability data may be determined from data stored in calendar function 130D, data stored in address book 130E or location data provided by location module 130F. Data from different modules may be combined to determine the response action. For example, location module 130F may indicate that the user is at his designated "home" and address book 130E data may indicate that a message received from the user's spouse has a specific reply text. As such, if an interrupt event is a message received from the spouse, then availability manager 130K may be programmed to generate a specific response to the spouse. Conversely, if the interrupt action is a telephone call from the user's boss, then availability manager 130K may be programmed to generate a different response action. Third process, shown at 406, generates and sends the response action. The response action may include context and configuration information obtained from data from the other modules. For example, the response action may be set to generate a telephone call or an email message.

Figure 5:
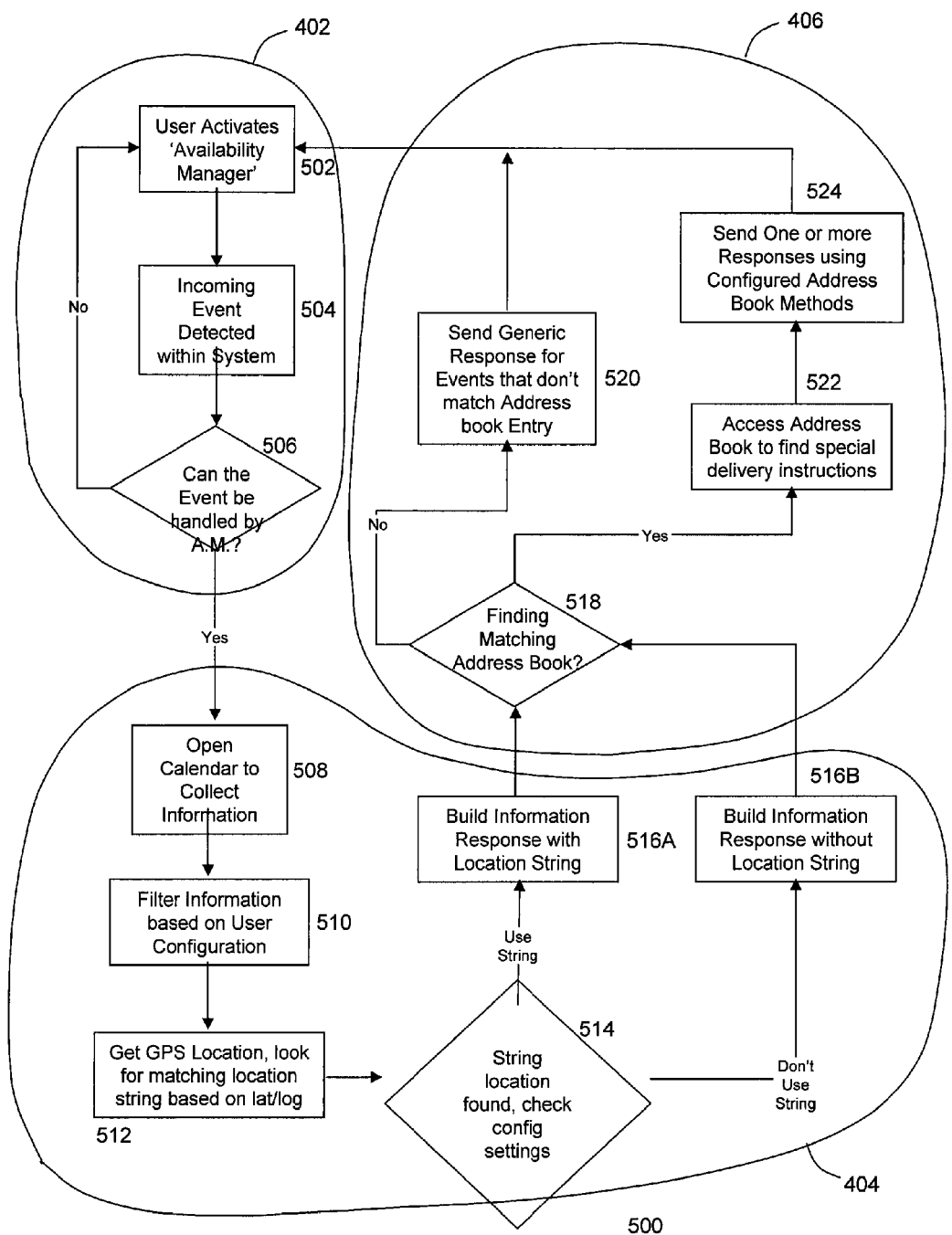
FIG. 5 is another flow chart of steps performed by the response application of FIGS. 1 and 3, providing further detail to the flow chart of FIG. 4.

Referring to FIG. 5 flow chart 500 provides further detail on the three processes shown in generally in chart 400 of FIG. 4. Each process is described in turn.

For first process 402, it starts by the user activating availability manager 130K at step 502. This may be done through a GUI produced by availability manager 130K. Once activated, availability manager 130K waits for receipt of any interrupt event. Typically, the event will be in the form of a received message received from communications subsystem 100 or short range communications system 102. Pertinent data relating to the received message will generated by applications in device 10 and given to availability manager 130K through an application programming interface (API) operating on device 10. When the event is received, it is analyzed to determine whether availability manager 130K can process the event. This is done at step 504. Then at decision point 506, if the event can be processed, then availability manager 130K starts second process 402; otherwise first process 402 loops back to step 502.

The main function of second process 404 is to identify relevant data stored in device 10 related to the received interrupt event and then build an appropriate response action to it, utilizing parameters defined by availability manager 130K. The response action is built as a macro. In particular, steps 508 and 510 examine data associated with calendar 130D to determine whether the user is currently unavailable. Additional location information may be obtained from data associated with location module 130E for the macro at step 512. The location information may include text data providing a string noting the contextual location associated with the GPS data. For example, the location "latitude 42.28N, longitude 80.23W" may be assigned the location "Home". At step 514, the data is examined to see if there is text data associated with the location and depending on whether or not the text data exists, the macro for a response is built with the text data at step 516A or without it at step 516B. This concludes second process 404.

Next, third process 406 begins at step 518, by taking the built macro response and examining the data in address book 130E to determine whether there is any address information associated with the sender of the interrupt event. If there is no stored address information relating to the sender of the interrupt event, then device 10 sends a generic response to the sender at step 520. However, if there is stored address information, then in step 522, the address data is scanned for any particular instructions regarding delivery of the response message. Using any such instructions, the set of response instructions are executed in step 524. Once a message is sent either in step 520 or step 524, third process 406 is effectively completed and the operation of availability manager 130K returns to first process 402 at step 502.

Table C provides a list of exemplary responses which can be stored and generated by availability manager 130K.

TABLE C

| Response type | Message |
| --- | --- |
| Generic | "Thanks for your message, I am in a meeting, please try me again in an hour." |
| Time identified | "Thanks for your message, I am in a meeting until 3:45 pm, please try me after that time." |
| Time and sender identified | "Thanks Bob for your message, I am in a meeting with the Finance Committee until 3:45 pm, please try me after that time." |
| Time, sender and location identified | "Thanks Bob for your message, I am in a meeting with the Finance Committee in the Meeting Room until 3:45 pm please try me again after that time." |

In one embodiment, each response type may be a template with data for the bold and underlined sections extracted from data provided by other modules (e.g. calendar 130D and address book 130E). The response types have differing levels of detail. As such, a particular response type may be selected to provide an appropriate amount of information, making it more useful to the recipient. For example, if a "trustworthiness" indicator is provided for each entry in address book 130E, then when interrupt events are received from a sender having a high level of trustworthiness, the response type may be set to provide more detail rather than less. Alternatively, if there is no entry in address book 130G for the sender of the interrupt event, availability module 130K may be set to provide no response or send the generic response.

It will be appreciated that in other embodiments, different processes may be defined to implement the general processes defined for the three processes identified above. As such, the functional boundaries of the processes may be redefined to include aspects of other processes.

Figure 6:
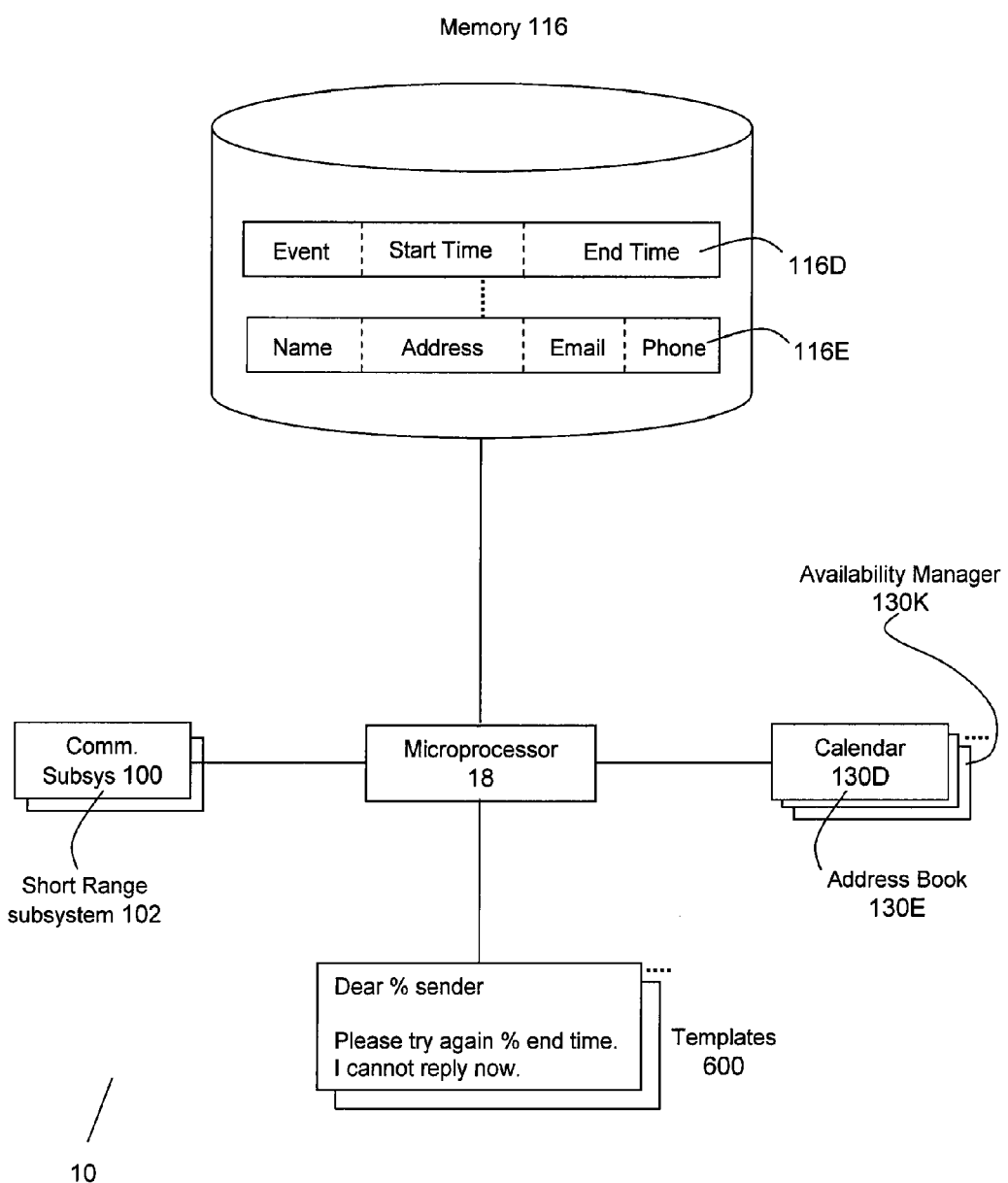
FIG. 6 is a schematic diagram of data relationships implemented by an embodiment of FIGS. 1 and 3.

FIG. 6 illustrates aspects interactions among data stored in device 10 with various applications 130 and data extracted and generated by application manager 130K. As shown, memory 116 stores data associated with each application 130. For example, a representative data entry for calendar 130D is shown as entry 116D and provides a field for the title of an event, its start time and its end time. Also, a representative data entry for address book 130E is shown as entry 116E and provides fields for a name for a contact person, the associated address, email address and telephone numbers for that person. Macro templates 600 are shown and are also stored in memory 116. Each template may be in any of the formats described earlier in Tables A, B or C or Form A. The templates 600 are generated and managed through availability manager 130K.

When availability manager 130K is operating on device 10, when an interrupt event is received by either communication subsystem 100 or short range subsystem 102, data relating to the event is provided to availability manager 130K through an API (as noted earlier). Depending on the status of the current availability of the user as set in manager 130K, it may selectively populate a template 600 as a response action. User fields in template 600 are set to be populated with data stored by various applications 130. For example, the "% sender" field in template 600 may be populated by the "name" data entry in entry 116E, after manager 130K cross references source information extracted from the interrupt event and correlates it to data maintained by address book 130E in flash memory 116. Similarly, the "% endtime" field may be populated by the "End Time" data entry in entry 116D, after manager 130K cross references end time data maintained by calendar 130D in flash memory 116. Other fields may be populated using data from other applications. Once the template 600 is fully populated, it is further processed by availability manager 130K and send through a selected communication system, per the parameters set for the response action.

It will be appreciated that the response application and other applications in the embodiments can be implemented using known programming techniques, languages and algorithms. Data storage, access and update algorithms allow data to be shared between applications (e.g. between calendar application and response application). Signals can be generated, sent, received and responded to between modules using known programming techniques. For example, when a telephone call is received by the communication module, an internal signal can be generated and sent to the response module to indicate that the call has been received. Known programming algorithms can be used to process data relating to received communications against stored response criteria and availability conditions to identify an appropriate response.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. A method of responding to a received interrupt event for a user of a communication device, comprising:

accessing data associated from at least one of a plurality of applications operating on said communication device to determine a current state of availability of said user;

accessing a database of response actions for incoming communications, said database listing response action categories against interrupt events, to attempt to determine a level of importance for said interrupt event based on source information of said interrupt event and if said database contains a record for said interrupt event, then determining whether a response action is to be sent in response to said interrupt event based on said level of importance when said communication device is in said current state of availability;

if said response action is to be sent, building said response action for said communication device having context data associated with at least one application operating on said communication device, said level of importance being used to determine a level of detail provided by said context data; and sending said response action from said communication device to another device to a sender associated With said interrupt event; and upon a change of said current state of availability, providing a notice on said communication device indicating previous response actions sent during a previous state of unavailability, said notice providing a link to initiate a response communication with said another device.

2. The method of responding to a received interrupt event for a user of a communication device as claimed in claim 1 wherein:

said response action includes a projected available time for said user extracted from said data.

3. The method of responding to a received interrupt event for a user of a communication device as claimed in claim 1 wherein:

said response action is sent using a communication method that was used to transmit said interrupt event to said communication device; and a second response action is sent from said communication device to said another device in using a different communication method than said communication method used to transmit said interrupt event.

4. The method of responding to a received interrupt event for a user of a communication device as claimed in claim 1 wherein:

a response template is provided to allow entry of said response and any other responses in view of said received interrupt event.

5. The method of responding to a received interrupt event for a user of a communication device as claimed in claim 1 wherein:

said data relates to a current location identified by a location application operating on said communication device;

said location application relates to a GPS function; and said response action indicates that said user is in said current location.

6. The method of responding to a received interrupt event for a user of a communication device as claimed in claim 1 wherein:

said context data is extracted from at least two applications operating on said communication device, and provides at least data associated with said sender and data associated with said current state of availability of said user.

7. The method of responding to a received interrupt event for a user of a communication device as claimed in claim 6 wherein:

said current state of availability of said user is selected from a do not disturb state, an available state and a not available state.

8. The method of responding to a received interrupt event for a user of a communication device as claimed in claim 1 wherein said database identifies a plurality of response actions using a plurality of communication methods for a particular sender of communications to said communication device.

9. The method of responding to a received interrupt event for a user of a communication device as claimed in claim 1 wherein:

said context data provides location and time data extracted from said data; and said data provides an indicator for said level of detail for said response.

10. The method of responding to a received interrupt event for a user of a communication device as claimed in claim 1 wherein said response action is selected from sending a generic response and sending a message containing customized fields for a sender based on source information of said interrupt event.

11. The method of responding to a received interrupt event for a user of said communication device as claimed in claim 1 wherein
upon said change of said current state of availability, sending another response action from said communication device to said another device advising of said change utilizing log data of send response actions for said communication device.

12. A method of responding to a received interrupt event for a user of a communication device, comprising:
accessing data associated from at least one of a plurality of applications operating on said communication device to determine a current state of availability of said user;
accessing a database of response actions for incoming communications, said database listing response action categories against interrupt events, to attempt to determine a level of importance for said interrupt event based on source information of said interrupt event and if said database contains a record for said interrupt event, then determining whether a response action is to be sent in response to said interrupt event based on said level of importance when said communication device is in said current state of availability;
if said response action is to be sent,
building said response action for said communication device having context data associated with at least one application operating on said communication device, said level of importance being used to determine a level of detail provided by said context data; and
sending said response action from said communication device to another device to a sender associated with said interrupt event; and
upon a change of said current state of availability, sending another response action from said communication device to said another device advising of said change utilizing log data of sent response actions for said communication device providing a notice on said communication device indicating previous response actions sent during a previous state of unavailability.

13. A communication device for receiving and responding to a received interrupt event, comprising:
microprocessor;
a calendar application providing instructions to said microprocessor to track and provide a current state of availability of a user of said communication device utilizing availability data provided about said user to said communication device;
a communication module to receive and send communications utilizing at least one communication technology;
an application providing instructions to said microprocessor
to track said received interrupt event received from another device by said communication module;
to access a database of response actions for incoming communications, said database listing response action categories against interrupt events to attempt to determine a level of importance for said interrupt event based on source information of said interrupt event;
if said database contains a record for said interrupt event, then to determine whether a response action is to be sent in response to said interrupt event based on said level of importance when said communication device is in said current state of availability;
and if said response action is to be sent,
to build said response action for said communication device having context data associated with at least one application operating on said communication device, said level of importance being used to determine a level of detail provided by said context data; and
to send said response action from said communication device to said another device;
and
upon a change of said current state of availability
to provide a notice on said communication device indicating previous response actions sent during a previous state of unavailability, said notice providing a link to initiate a response communication with said another device.

14. The communication device as claimed in claim 13 wherein
for said response action, said application provides details relating to said current state of availability.

15. The communication device as claimed in claim 14 wherein said response action is sent using a communication technology associated with said received interrupt event.

16. The communication device as claimed in claim 15 wherein
said at least one communication technology comprises at least data and telephonic communications; and
said application sends said response action using a different communication technology from a communication technology associated with said received interrupt event.

17. The communication device as claimed in claim 13 wherein:
said application sends another response action to said another device upon a change of said current state of availability of said user.

18. The communication device as claimed in claim 13 wherein:
said application generates a notice indicating responses sent prior to a change of said current state of availability.

19. The communication device as claimed in claim 13 wherein:
said context data is extracted from at least two applications operating on said communication device, and provides at least data associated with said sender and data associated with said current state of availability of said user.

20. The communication device as claimed in claim 19 wherein:
said current state of availability of said user is selected from a do not disturb state, an
available state and a not available state.

21. The communication device for receiving and responding to a received interrupt event as claimed in claim 13 wherein
upon said change of said current state of availability, said application provides instructions to said microprocessor to send another response action from said communication device to said another device advising of said change utilizing log data of send response actions for said communication device.

* * * * *